US007027837B1

(12) United States Patent
Uhlik et al.

(10) Patent No.: US 7,027,837 B1
(45) Date of Patent: Apr. 11, 2006

(54) ANTENNA ARRAY FOR POINT-TO-POINT MICROWAVE RADIO SYSTEM

(75) Inventors: Christopher R. Uhlik, Danville, CA (US); Mithat C. Dogan, Sunnyvale, CA (US)

(73) Assignee: ArrayComm LLC., San Jose, CA (US)

( * ) Notice: Subject to any disclaimer, the term of this patent is extended or adjusted under 35 U.S.C. 154(b) by 1043 days.

(21) Appl. No.: 09/966,372

(22) Filed: Sep. 27, 2001

(51) Int. Cl.
*H04M 1/00* (2006.01)

(52) U.S. Cl. ..................... 455/562.1; 455/25; 455/456; 375/347

(58) Field of Classification Search .................. 455/25, 455/63.4, 69, 101, 272, 275, 276.1, 278.1, 455/562.1; 342/367, 370; 343/781 CA, 343/781 P, 878, 912
See application file for complete search history.

(56) References Cited

U.S. PATENT DOCUMENTS 5,991,345 A * 11/1999 Ramasastry ................. 375/347
2001/0031647 A1* 10/2001 Scherzer et al. ............ 455/562
2002/0119790 A1* 8/2002 Judson et al. ............... 455/456

* cited by examiner

*Primary Examiner*—Curtis Kuntz
*Assistant Examiner*—Tuan H. Nguyen
(74) *Attorney, Agent, or Firm*—Blakely Sokoloff Taylor & Zafman LLP

(57) ABSTRACT

A system and method for communicating information between two locations via a wireless microwave link is provided. The system includes at least two antennas, each to transmit information as a narrow beam signal to be directed toward a focal point at a remote location. The antennas include at least one antenna to transmit a narrow beam signal toward a redirection point different from the focal point. A redirection device is located at the redirection point to receive the narrow beam signal from the at least one antenna element and to redirect the received narrow beam signal toward the receiver. The redirection point is located such that the narrow beam signals from the at least two antenna elements converge and overlap to form proximate to the receiver, an interference pattern that includes peaks and nulls having a peak-to-peak spacing narrower than the width of each received narrow beam signal.

40 Claims, 4 Drawing Sheets

ANTENNA ARRAY FOR POINT-TO-POINT MICROWAVE RADIO SYSTEM

TECHNICAL FIELD

This application relates to point-to-point radio systems, and more particularly to antenna arrays for point-to-point radio systems.

BACKGROUND

With the increasing use of point-to-point radio systems the efficient use of the allocated transmission spectrum is a growing concern. To improve spectral efficiency, conventional millimeter wave point-to-point radio systems often utilize sophisticated Quadrature Amplitude Modulation (QAM) and error correcting codes to achieve data rates of up to 7 bits per second per hertz of channel bandwidth. For example, one such system that operates at 28 GHz, uses 256 QAM modulation, a symbol rate of 125 M symbols/second, 20% excess bandwidth, and a rate 7/8 convolutional code concatenated with a (188, 204) byte Reed Solomon block code to achieve a spectral efficiency of about 5.3758 bits/Hz. Recent improvements in modulation techniques and error correction techniques have led to only marginal improvements in spectral efficiency.

SUMMARY

A system and method for communicating information between two locations via a wireless microwave link is provided. The system may include at least two antennas, each to transmit information as a narrow beam signal to be directed toward a focal point at a remote location. The antennas may include at least one antenna to transmit a narrow beam signal toward a redirection point different from the focal point. A redirection device located at the redirection point to reflect the narrow beam signal from the at least one antenna element and to redirect the received narrow beam signal toward the receiver. The redirection point is located such that the narrow beam signals from the at least two antenna elements converge and overlap to form an interference pattern proximate to the receiver. The interference pattern includes peaks and nulls that have a peak-to-peak spacing narrower than a width of each of the received narrow beam signals.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
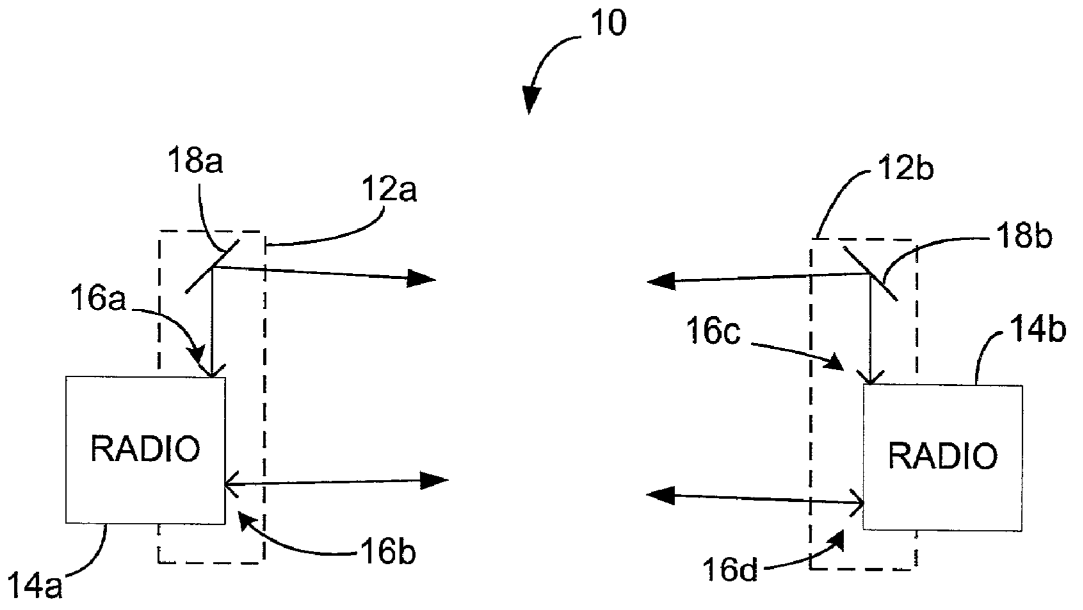
FIG. 1 is a top-view block diagram representation of a radio system.

FIG. 1 shows a point-to-point radio system 10 that may be used for communicating information over multiple channels via line of sight communications between building rooftops. The radio system 10 preferably includes two antenna arrays 12*a* and 12*b* for communicating information between two locations. Coupled to each of the antenna arrays 12*a* and 12*b* are corresponding radios 14*a* and 14*b*. The radio 14*a*, when performing a transmitting function, generates narrow beam signals that contain the communicated information. The radio 14*b* when performing a receiving function, receives the signal created from the superposition of the narrow beam signals from radio 14*a* at the receiving location. The radios 14*a* and 14*b* may each include separate radios for generating and receiving the signals. The radio system 10 preferably operates in full duplex mode with each location transmitting and receiving. However, the radio system 10 may also operate in half-duplex mode or be comprised of only one of a transmitting portion and a receiving portion having an antenna array 12.

Each of the antenna arrays 12*a* and 12*b* is comprised of two or more antenna elements 16*a*–16*d* with at least one redirection device 18*a* and 18*b* configured in relation to a corresponding one of the antenna elements 16*a* and 16*c* to redirect signals that are communicated between the corresponding antenna element 16*a* and the other antenna array 12*b* or 12*a*. For example, a signal generated from antenna element 16*a* of antenna array 12*a* is directed towards a redirection point at which the redirection device 18*a* is located. The signal is redirected from the redirection device 18*a* towards the receiving antenna array 12*b*. The redirection point is selected so that the redirection device 18*a* is spaced a separation distance from other redirection devices if any, and/or the antenna elements 16*b* that point directly at the receiving antenna array 12*b*. The separation distance is chosen to control the spacing of peaks and nulls in the interference pattern that is created at the receiving location by the superposition of the narrow beam signals emitted from antenna array 12*a*.

Figure 2:
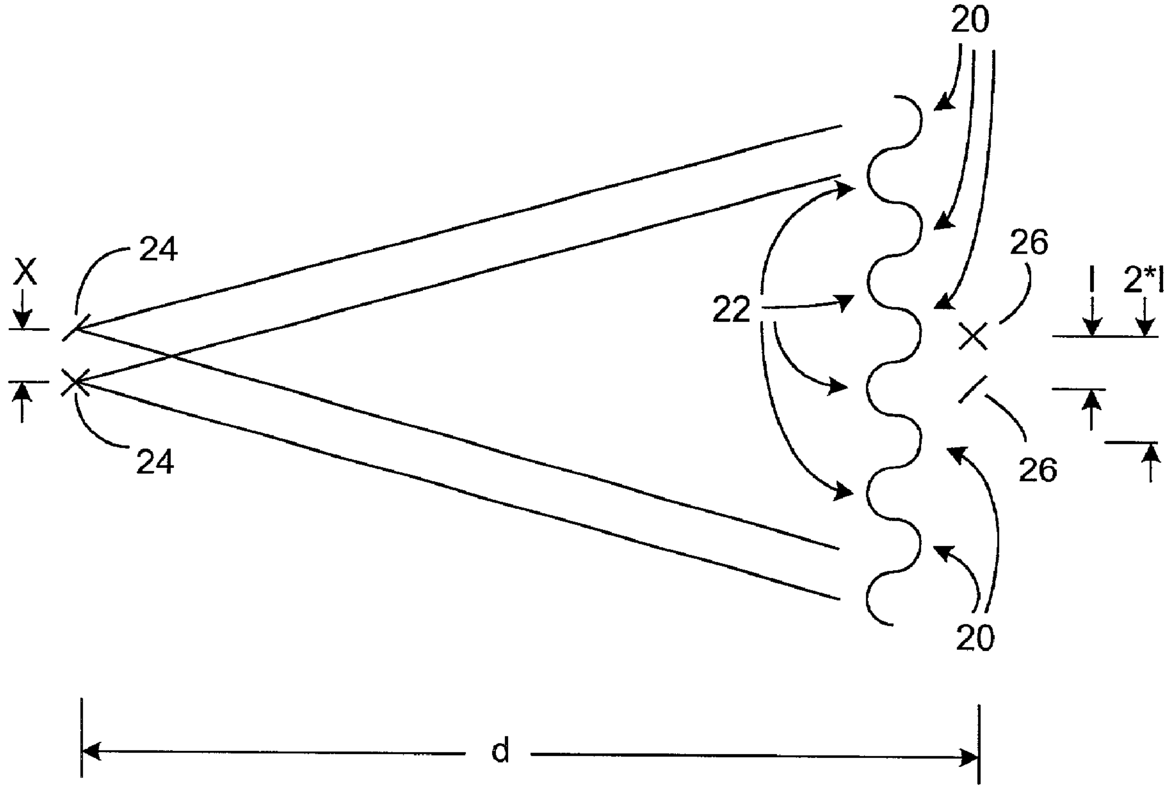
FIG. 2 is a diagram of an interference pattern formed at a receiving antenna array.

FIG. 2 shows an interference pattern that may be created at the receiving location. The locations of the peaks 20 and nulls 22 are a function of the distance between the antenna arrays 12*a* and 12*b*, the size of the transmitting aperture, and the radio carrier wavelength, lambda. The transmitting aperture, which corresponds to the separation distance, x, between the redirection devices 18 and the antenna elements 16*b* that transmit the narrow beam signals directly towards the receiving antenna array, is adjusted to control the spacings of the peaks and nulls in the interference pattern. The precise location of the peaks 20 and nulls 22 also may be controlled by changing the phasing of the signals generated from the transmitting antenna elements 24 so that, as the phasing is varied, the interference pattern shifts causing the location of the peaks 20 and nulls 22 to shift in relation to the receiving antenna elements 26. In addition, a second set of narrow beam signals may be transmitted from the transmitting antenna elements 24. The phasing of the second set of signals may be controlled so that a peak of the interference pattern associated with the second set of signal falls on one receiving antenna element 26, while a peak of the interference pattern associated with the first set of signals falls on another receiving antenna element 26. Similarly, additional sets of signals may be transmitted in parallel by increasing the quantity of antenna elements 16 and/or redirection devices 18 at the transmitting antenna array 12*a* and the receiving antenna array 12*b*. By linear superposition of multiple transmit signals, suitably phase and amplitude controlled, parallel data streams may be transmitted to each receiving antenna separately. The null of one pattern corresponding to a peak (or near peak) of another pattern allows the first signal to not interfere with the second signal.

If the transmitting antenna elements 24 are placed closer together, then the transmitting array aperture becomes smaller, which in turn widens the main lobe, and the spacing between the nulls and peaks of the interference. The increased separation requirement between the nulls and the peaks of the interference pattern forces the receiving antenna elements 26 need to be widely spaced in order to achieve orthogonality. To attain a symmetric link and maintain orthogonality simultaneously in both directions, the transmitting antenna elements 24 are placed further apart, causing the aperture to increase, the main lobe 20 to narrow, and the distance between the peaks 20 and the nulls 22 to decrease. The spatial repetition frequency of the interference pattern that is created at the receiving antenna elements 26 defines a peak-to-peak spacing that is much narrower than the width of the received narrow beam signals that are generated by the transmitting antenna elements 24. For example, for a 5 kilometer radio link and 38 dBi parabolic dish antennas, the 3 dB beamwidth at the target might be 250 meters across. However, with 28 GHz radio carrier and a transmit array aperture of 10 meters, the peak-to-null spacing would be less than 10 meters.

Referring to FIG. 1, the redirection device 18 may be used advantageously to adjust the transmitting aperture by providing separation between narrow beam signals. Setting the redirection device 18*a* separation distance, x, from other redirection devices and antennas 16*b* that transmit directly towards the other antenna array 12*b* controls the spacing of the peaks and nulls of the interference pattern created at the receiving antenna array 12*b*. In addition, spacing apart the redirection device 18*b* and antenna element 16*d* of the receiving antenna array 12*b* in a similar fashion so that the antenna arrays 12*a* and 12*b* are symmetrical may provide further advantages such as optimal full-duplex operation and a more efficient use of transmitted signal power. For a radio system 10 that includes multiple transmitting and receiving antenna elements, there is a preferable range for the separation distance, x, between the redirection devices 18*a* and antenna elements 16*b* of the transmitter so that one of the interference pattern peaks falls naturally on one receiving antenna while the other receiving antennas lie in nulls. In addition, the redirection devices 18*b* and antenna elements 16*c* and 16*d* of the receiver are preferably spaced apart an interference distance so that, while a peak corresponds to one redirection device or antenna element, nulls correspond to the other redirection devices and antenna elements.

If "x" is the separation distance, "d" is the distance between antenna arrays, and lambda is the radio carrier wavelength, then the following relationship holds for the preferable separation distance:

$$x \approx \sqrt{\frac{\lambda \cdot d}{2}}$$

For example, at 28 GHz, the United States Local Multipoint Distribution Service (US LMDS) band, and various antenna array separations, the following table enumerates the optimum separation distances;

| Array distance | Separation distance |
|---|---|
| 1 km | 2.315 m |
| 3 km | 4.009 m |
| 5 km | 5.175 m |

At 5.5 GHz, the United States Unlicensed National Information Infrastructure (US UNII) band, and 10 km, the optimum spacing is 16.51 meters.

For two transmitting antenna elements and two receiving antenna elements, this corresponds to a coupling matrix row of about [1 0]. For a different phasing of the transmitting antennas, the coupling matrix row is about [0 1]. Likewise for a given distance d, an appropriate choice of antenna element/redirection element spacing x, and appropriate choices for transmitter signals phases of N transmitting antennas and N receiving antennas, the coupling matrix can approximate a diagonal matrix. Thus, the cross-coupling matrix between the array of transmitters and the array of receivers is approximately a diagonal matrix with small condition number and is readily invertible. For the ideal special case, the cross-coupling matrix is an identity matrix in which the condition number is 1. Therefore, multiple transmitters and receivers may be advantageously operated in parallel resulting in an increase in the number of operational communication channels between the antenna arrays 12*a* and 12*b*. Since the communication channels are approximately orthogonal, the data rates of the independent channels may be added to determine the aggregate rate of information flowing between the antenna arrays 12*a* and 12*b*. Spacing the transmitting antenna elements apart by the optimal separation distance improves the benefits of spatial processing. Nearly independent parallel radio channels may be produced that can be readily utilized by adaptive spatial processing to dramatically increase data rate without utilizing more radio spectrum. By setting the interference distance approximately equal to the separation distance, x, so that the receiving antenna array is symmetrical to the transmitting antenna array, nearly independent full-duplex parallel radio channels may be established. When the array element spacing is optimized for the wavelength and distance, required transmit power for a given data rate is minimized.

Although the interference distance is preferably set equal to the separation distance so that a symmetrical link is set up between the antenna arrays 12*a* and 12*b*, nearly equivalent interference and separation distances are not required. For example, referring to FIG. 2, if the interference distance is not equal to the separation distance, the interference pattern may be controlled to align a null 22 with one receiving antenna element 26 and something less than a peak 20 with another antenna element 26. The received signal has a lower received power level (for a constant transmitted power level) than a signal that is aligned with the peaks 20 and nulls 22. The interference distance also may be set equal to odd multiples of the separation distance, which also results in the peaks 20 and nulls 22 being aligned with the receiving antenna elements 26.

The antenna elements 16*a*–16*d* are preferably directional antenna elements such as parabolic antenna elements. One such example includes a 30 cm parabolic dish with a gain of 38 dBi and beam width of about 1.8 degrees. All other types of directional antenna elements also may be used such as curve-shaped antenna elements. A curve-shaped antenna element may be used in combination with a curve-shaped redirection device 18*a*–18*b* to, in combination, provide the effect of a parabolic or near-parabolic shape.

The redirection device 18 may include devices and objects that may be used to reflect a narrow beam signal. Such devices and objects may include passive reflectors that have flat surfaces, curve-shaped surfaces, and parabolic-shaped surfaces. The redirection device 18 may be a dedicated reflector or an object such as a building that has a reflective surface. In addition, the redirection device 18 may be located in close proximity, for example several meters, to the corresponding antenna element 16*b* or at a distance such as atop another building. The redirection device 18 may be constructed from flat plate reflectors set at 45 degrees and used in combination with a standard parabolic antenna element 16 that is pointed perpendicular to a point-to-point radio link path extending between the antenna arrays 12*a* and 12*b*. Another approach combines curve-shaped elements for both the redirection device 18 and the antenna element 16 that points at the redirection device 18. While curved reflectors are generally more difficult to manufacture than flat plates, the curved elements may provide higher gain, better stiffness, or less weight than flat plates.

The redirection device 18 preferably includes a reflecting surface composed of a reflecting material for reflecting the narrow beam signals. Suitable reflecting surfaces include metallic surfaces, metallized surfaces, screens, grating patterns, and the like.

Figure 3A:
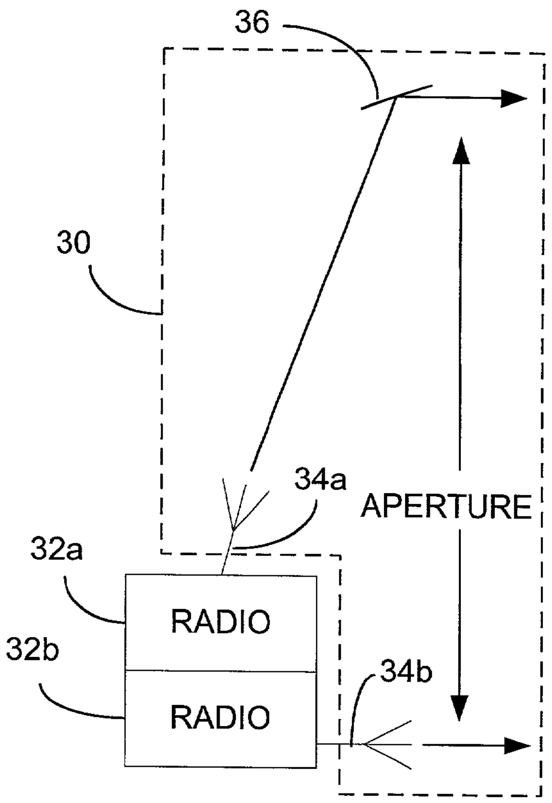
FIG. 3A is a top-view of an antenna array.

FIG. 3A shows an antenna array 30 coupled to a pair of radios 32*a* and 32*b* that are mounted back-to-back, thereby minimizing the use of rigid wave-guides between radios.

In conventional systems, two (or more) transmitting radios are typically spaced apart and interconnected by rigid wave-guides to share local oscillator signals so that the transmitting radios can generate the frequency-coherent, phase offset signals that are required for precise beam and null steering. At very high frequencies such as 28 GHz, running rigid wave-guides between multiple radios that are spaced 7 or 8 meters apart may become difficult and expensive. Similar to the transmitting radios, conventional receiving radios also typically share local oscillator signals with each other to facilitate the modem's proper separation and demodulation of the multi-channel received signals from the transmitting radios.

Antenna elements 34*a* and 34*b*, associated with respective radios 32*a* and 32*b*, generate narrow beam signals that are directed towards another antenna array (not shown). At least one antenna element 34*a* is pointed at a redirection device 36 instead of directly at the other antenna array. The redirection device 36 is spaced apart from the other antenna 34*b* by the separation distance described above. The narrow beam signal from the antenna element 34*a* is redirected from the redirection device 36 directly toward the other antenna array. Using one or more redirection devices 18 enables coherent radios to be physically co-located while obtaining a large aperture antenna array. Physical co-location of the radios 32*a* and 32*b* facilitates the sharing of high frequency local oscillator signals and simplifies packaging of multi-channel radios. A receiving antenna array (not shown) may be configured similarly, so that the receiving radios may be co-located, thereby minimizing the difficulty of sharing local oscillator signals.

Figure 3B:
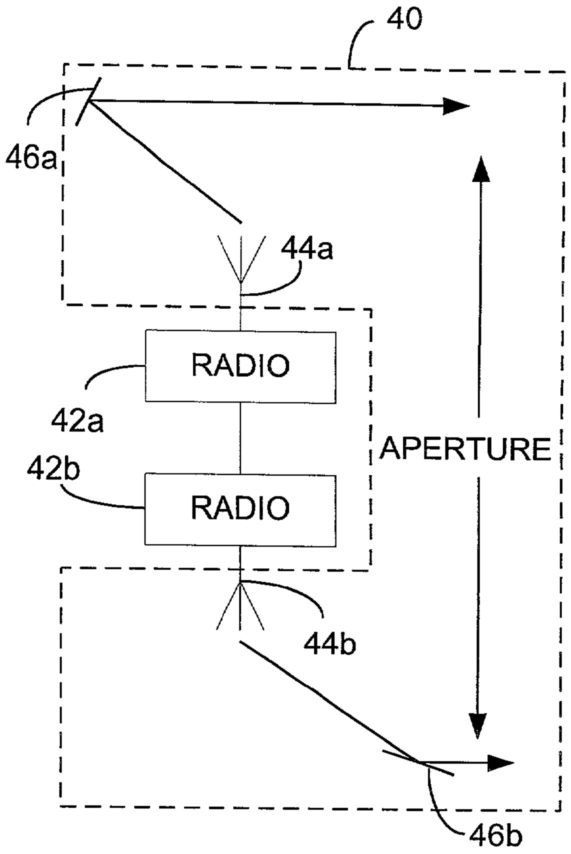
FIG. 3B is a top-view of an antenna array.

FIG. 3B shows an antenna array 40 that is similar in function to the antenna arrays 10 and 30 except that each of the antennas 44*a* and 44*b* in the antenna array 40 direct narrow beam signals towards corresponding redirection devices 46*a* and 46*b*. The redirection devices 46*a* and 46*b* are spaced apart from each other the separation distance so that when the antenna array 40 is a transmitting array, the locations of main lobe nulls and peaks fall upon receiving elements of a receiving antenna array (not shown). When the antenna array 40 is a receiving array, the redirection devices 46*a* and 46*b* are spaced apart from each other the interference distance so that the locations of main lobe nulls and peaks fall upon the redirection devices 46*a* and 46*b*. The redirection devices 46*a* and 46*b* may be located at any angle to a link path extending between the antenna array 40 and the other antenna array (not shown) so long as the devices 46*a* and 46*b* are spaced apart by approximately the separation distance, x. In addition, two or more redirection devices may be used in series, so that a narrow beam signal that is transmitted from an antenna element is first redirected by one redirection device, then the redirected narrow beam signal is redirected by another redirection device.

Figure 4:
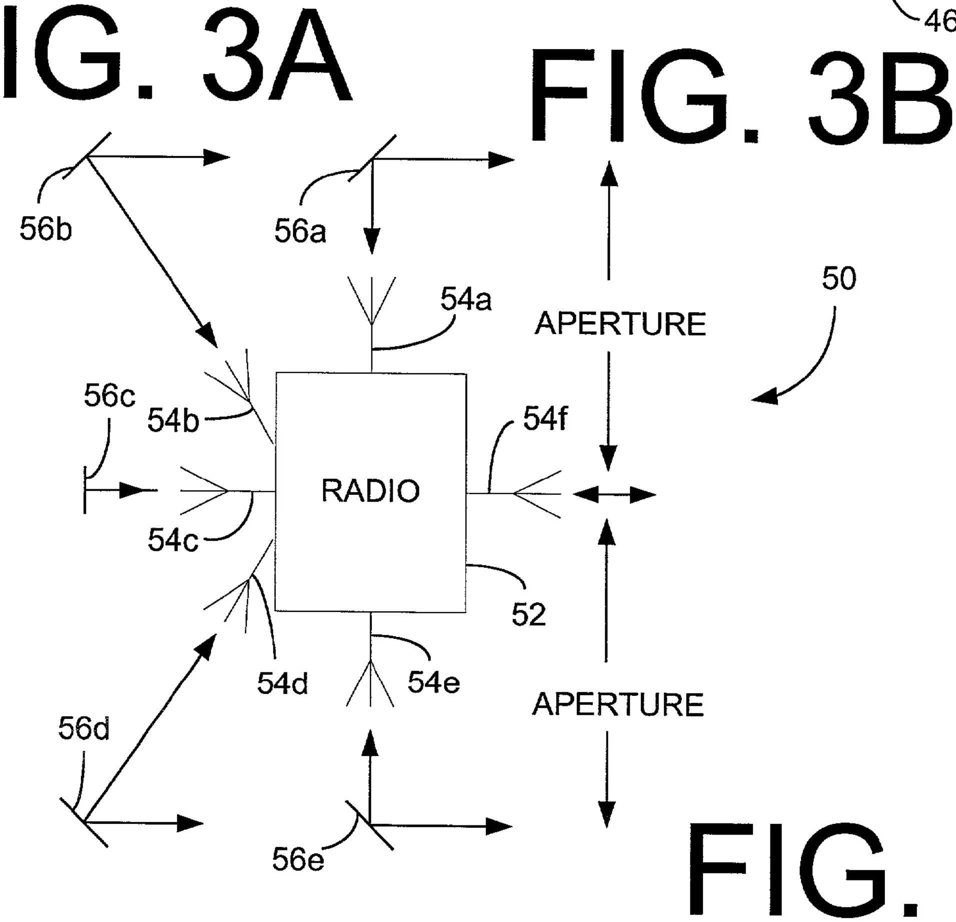
FIG. 4 is a top-view of an antenna array.

Shown in FIG. 4 is another antenna array 50 in accordance with the teachings of the invention. The antenna array 50 is similar in function to the antenna arrays 10, 30, and 40. The antenna array 50 includes six antenna elements 54*a*–54*f* for transmitting or receiving signals. Five redirection devices 56*a*–56*e* are located at redirection points to redirect signals between corresponding ones of the antenna elements 54 and a receiving antenna array (not shown). To support six independent channels the antenna array 50 includes redirection devices 56*a*–56*e* and one of the antenna elements 54*f* that are spaced apart from each other by the separation distance, x, and by controlling the phasing of the signals that are transmitted from the antenna elements 54*a*–54*f*.

Figure 5:
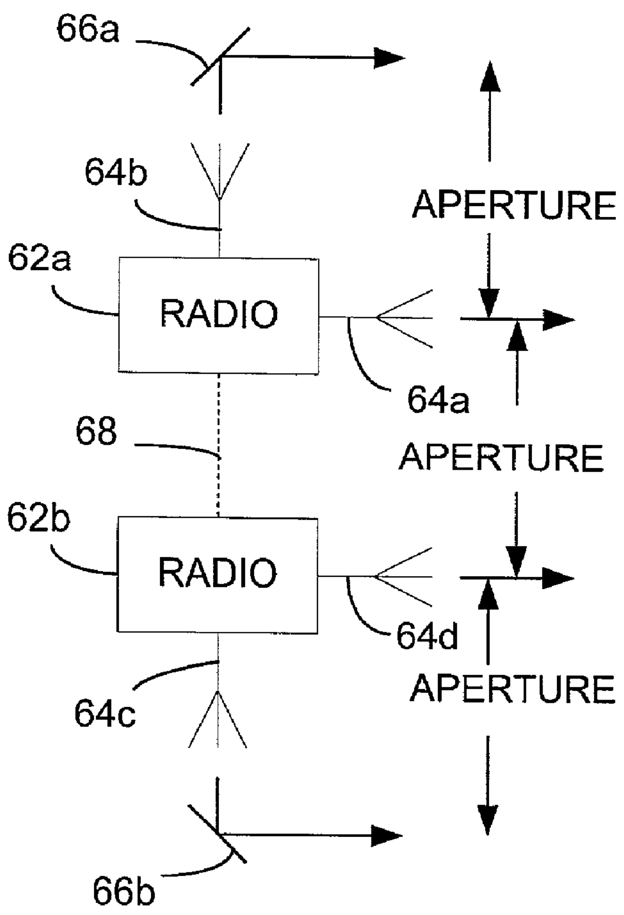
FIG. 5 is a top-view of an antenna array.

FIG. 5 shows a radio system 60 similar in function to the radio system 10 except that the radio system 60 includes radios 62*a* and 62*b* that are not in close proximity to each other. For example, the radios 62*a* and 62*b* may be separated by several meters or more. The radios 62*a* and 62*b* communicate information with receiving radio system (not shown) via narrow beam signals that are transmitted via antenna elements 64*a*–64*d*. Each radio 62*a* and 62*b* is associated with at least one redirection device 66*a* and 66*b* that redirects signals between one of the antenna elements 64*a*–64*d* and the other radio system. The two radios 64*a* and 64*b* are interconnected via an electrical link 68 such as a rigid wave guide assembly or a wireless assembly to share a common local oscillator signal.

Figure 6:
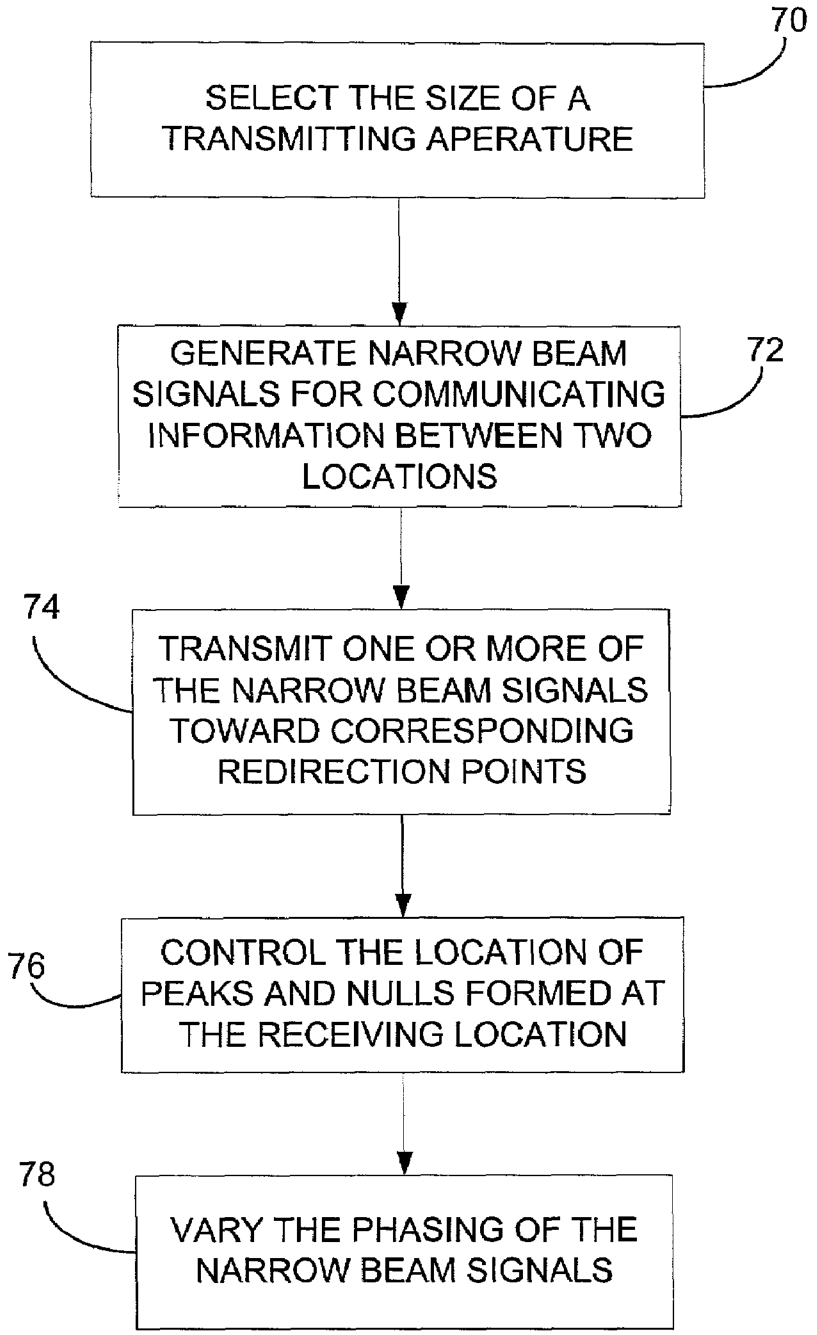
FIG. 6 is a flow diagram of a method of communicating information between two locations.

FIG. 6 is a flow diagram of a method of communicating information between a first location and a second location. At state 70, the location of a redirection point is selected so that narrow beam signals transmitted from the first location are spaced apart from each other by a predetermined separation distance. The separation distance is selected so that an interference pattern having main lobe peaks and nulls is formed in the vicinity of the second location, in which the spacing of the peaks is narrower than the received narrow beam signals. At state 72, narrow beam signals for communicating information between the two locations are generated. The narrow beam signals are transmitted from the first location to be directed toward an antenna array at the second location. At state 74, one or more of the narrow beam signals is directed at a corresponding redirection point. The narrow beam signals directed at redirection points are redirected towards the second location antenna array. At state 76, the interference pattern may be controlled by methods such as spatial processing so that the location of a peak is aligned with one receiving element at the second location, and nulls are aligned with other receiving elements at the second location. The interference pattern may alternatively be controlled to align nulls with all but one of the receiving elements. The remaining receiving element is then aligned with a portion of the interference pattern other than a null allowing information to be carried from the transmitting array to this antenna. Continuing to state 78, the phasing of the transmitted narrow beam signals is varied so that the location of the peaks and nulls is precisely controlled.

Other embodiments are within the scope of the following claims.

What is claimed is:

1. An antenna array for communicating information via a wireless microwave link between two locations, the antenna array comprising:

at least two antenna elements each to transmit information as a narrow beam signal to be directed toward a receiver at a remote location, the antenna elements including at least one antenna element to transmit a narrow beam signal toward a redirection point different from the receiver; and a redirection device located at the redirection point to receive the narrow beam signal from the at least one antenna element and to redirect the received narrow beam signal toward the receiver, wherein the redirection point is located such that the narrow beam signals from the at least two antenna elements converge and overlap to form an interference pattern proximate to the receiver, the interference pattern includes peaks and nulls having a peak-to-peak spacing narrower than a width of each of the received narrow beam signals.

2. The antenna array of claim 1 wherein the redirection device and others of the antenna elements that transmit narrow beam signals directly towards the receiver are spaced apart by a separation distance.

3. The antenna array of claim 2 wherein the separation distance is selected to approximately solve the following equation;

$$x \approx \sqrt{\frac{\lambda \cdot d}{2}}$$

where:

x is the separation distance, d is a distance between a location of the at least two antennas and the receiver, and lambda is a wavelength of the narrow beam signals.

4. The antenna array of claim 1 wherein another of the at least two antenna elements aims another narrow beam signal directly at the second location.

5. The antenna array of claim 1 wherein the peak-to-peak spacing is approximately equal to twice the separation distance.

6. The antenna array of claim 1 wherein the redirection device comprises a curve-shaped passive reflector.

7. The antenna array of claim 1 wherein the redirection device comprises a flat-plate reflector.

8. The antenna array of claim 1 wherein one or more of the antenna elements comprises a standard parabolic antenna.

9. The antenna array of claim 4 wherein one or more of the antenna elements comprises a curve-shaped antenna.

10. The antenna array of claim 1 wherein the redirection device comprises a reflector set at an angle of 45 degrees relative to a path of the narrow band signal from the corresponding antenna element.

11. The antenna array of claim 1 wherein the redirection device and the at least two antenna elements are located on a common support structure.

12. The antenna array of claim 1 wherein a surface of the redirection device comprises a reflector material selected from the group consisting of metallic surfaces, metallized surfaces, screens, and grating patterns.

13. A communication system for communicating information via a wireless link between a first location and a second location, comprising:

a first antenna array arranged at the first location including;

at least two antenna elements each to transmit information as a narrow beam signal to be directed toward a second location, the antenna elements including at least one antenna element to transmit a narrow beam signal toward a redirection point different from the second location; and a redirection device located at the redirection point to reflect the narrow beam signal from the at least one antenna element and to redirect the received narrow beam signal toward the second location;

wherein the narrow beam signals directed towards the second location are spaced apart by a separation distance at the first location that results in an interference pattern being formed at the second location with peak-to-peak spacing narrower than the individual antenna element beams, the interference pattern including peaks and nulls; and a second antenna array arranged at the second location including at least two antenna elements to receive the narrow beam signals from the first antenna array.

14. The communication system of claim 12 wherein at least one of the second location antennas receives transmitted signals redirected from a redirection point; and a second location redirection device is located at the second location redirection point to redirect narrow beam signals received from the first location toward the at least one second location antenna.

15. The communication system of claim 14 wherein the second array antenna elements transmit information and the at least two first array antenna elements receive information such that full duplex communication over multiple spatial channels between the first location and the second location may be established.

16. The communication system of claim 13 wherein the separation distance is selected to approximately solve the following equation;

$$x \approx \sqrt{\frac{\lambda \cdot d}{2}}$$

where:

x is the separation distance, d is a distance between the first location and the second location, and lambda is a wavelength of the narrow beam signals.

17. The communication system of claim 14 wherein a one of the second location redirection device and second location antenna elements that directly receive signals from the first antenna array is approximately aligned with a peak of the interference pattern.

18. The communication system of claim 17 wherein the other of the second location redirection device and second location antenna elements that directly receive signals from the first antenna array is spaced apart from the one by approximately the separation distance.

19. The communication system of claim 14 wherein another of the first location antenna elements aims another narrow beam signal directly at the second location.

20. The communication system of claim 14 wherein at least one of the first antenna array redirection device and the second antenna array redirection device comprise a curve-shaped passive reflector.

21. The communication system of claim 14 wherein at least one of the first antenna array redirection device and the second antenna array redirection device comprise a flat-plate reflector.

22. The communication system of claim 14 wherein the first antenna array antenna elements and the second antenna array antenna elements comprise directional antennas.

23. The communication system of claim 14 wherein at least one of the first antenna array antenna elements and the second antenna array antenna elements comprise a standard parabolic antenna.

24. The communication system of claim 20 wherein at least one of the first antenna array antenna elements and the second antenna array antenna elements comprise a curve-shaped antenna.

25. The communication system of claim 14 wherein the first antenna array redirection device is located at the first location.

26. The communication system of claim 14 wherein at least one of a surface of the first antenna array redirection device and a surface of second antenna array redirection device are made of a reflector material selected from the group consisting of metallic surfaces, metallized surfaces, screens, and grating patterns.

27. A method of communicating information via a wireless link between a first location and a second location, the method comprising:

- transmitting a first narrow beam signal from the first location to be directed towards a receiver at the second location;
- transmitting at least a second narrow beam signal from the first location towards a first redirection point associated with the first location;
- redirecting the second narrow beam signal from the first redirection point towards the receiver; and
- spacing the first and second narrow beam signals apart by a predetermined separation distance at the first location such that the narrow beam signals from the first location converge and overlap to form an interference pattern proximate to the receiver, the interference pattern including peaks and nulls having a peak-to-peak spacing narrower that a width of each of the received narrow beam signals.

28. The method of claim 27 wherein the first narrow beam signal is aimed directly at the receiver.

29. The method of claim 27 wherein the first narrow beam signal is aimed towards a second redirection point different than the receiver.

30. The method of claim 29 further comprising redirecting the first narrow beam signal from the second redirection point towards the receiver.

31. The method of claim 27 wherein the separation distance is selected to approximately solve the following equation;

$$x \approx \sqrt{\frac{\lambda \cdot d}{2}}$$

where:

- x is the separation distance,
- d is a distance between the first location and the second location, and
- lambda is a wavelength of the narrow beam signals.

32. The method of claim 27 further comprising controlling phasing of the first and second narrow beam signals to control locations of the peaks and nulls.

33. The method of claim 32 wherein the locations of the peaks and nulls are interchanged in response to controlling the phase of the first and second narrow beam signals.

34. The method of claim 32 further comprising transmitting from the first location, a plurality of other narrow beam signals in superposition, each of the narrow beam signals including a data stream;

- spacing apart each of the other narrow beam signals at the first location by the separation distance;
- controlling of the other narrow beam signals controlled in amplitude and phase such that peaks and nulls of the superposed signals are interchanged, so that in response thereto, the receiver generates independent data streams.

35. The method of claim 27 wherein the peak-to-peak spacing is approximately equal to twice the separation distance.

36. The method of claim 27 further comprising receiving the first and second narrow beam signals in superposition at the second location, wherein receiving devices for receiving the narrow beam signals are spaced apart approximately the separation distance.

37. The method of claim 36 further comprising varying phasing of the fist and second narrow beam signals to control alignment of the peaks and nulls with receiving devices of the receiver.

38. The method of claim 36 further comprising varying the amplitudes of the narrow beam signals to control alignment of nulls with receiving devices of the receiver.

39. The method of claim 27 wherein redirecting the second narrow beam signal comprises passively reflecting the second narrow beam signal.

40. The method of claim 27 further comprising locating the first redirection point at the first location.

* * * * *